Figure 1:
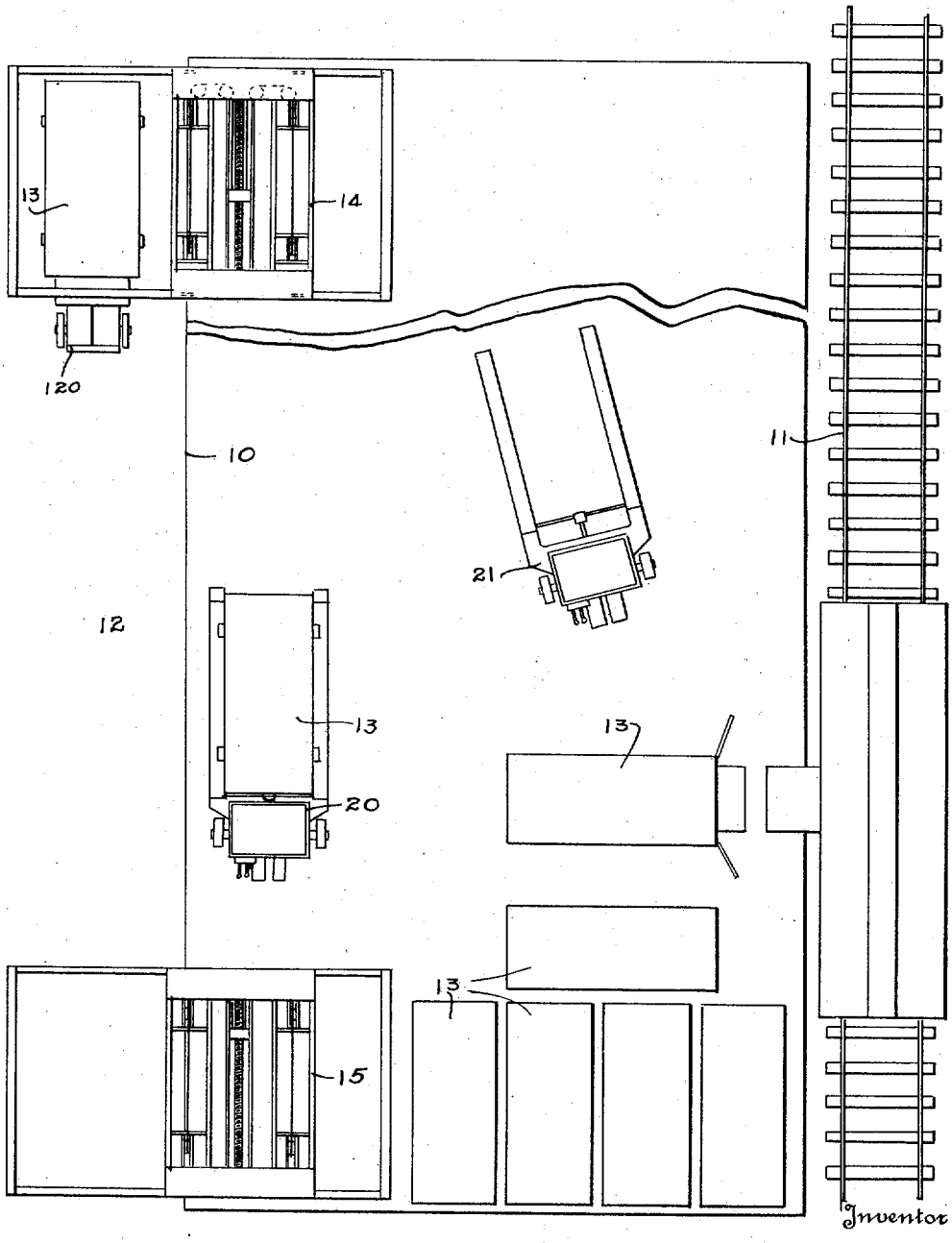

B. F. FITCH

Feb. 28, 1933. SYSTEM AND APPARATUS FOR HANDLING FREIGHT Re. 18,752

5 Sheets-Sheet 1

Original Filed July 14, 1926

Inventor

Benjamin F. Fitch

By Bates Macklin Golick & Pearce

Attorneys

B. F. FITCH

Feb. 28, 1933. SYSTEM AND APPARATUS FOR HANDLING FREIGHT Re. 18,752

5 Sheets-Sheet 2

Original Filed July 14, 1926

Inventor

Benjamin F. Fitch

By Bates Macklin Golrick & Pearce

Attorneys

B. F. FITCH

Feb. 28, 1933. SYSTEM AND APPARATUS FOR HANDLING FREIGHT Re. 18,752

5 Sheets-Sheet 3

Original Filed July 14, 1926

Inventor

Benjamin F. Fitch

By Bates, Macklin, Holrick & Peare

Attorneys

B. F. FITCH

Feb. 28, 1933. SYSTEM AND APPARATUS FOR HANDLING FREIGHT Re. 18,752

5 Sheets-Sheet 4

Original Filed July 14, 1926

Inventor

Benjamin F. Fitch

By Bates Mackelin Golick + Pearce

Attorneys

B. F. FITCH

Feb. 28, 1933. SYSTEM AND APPARATUS FOR HANDLING FREIGHT Re. 18,752

5 Sheets-Sheet 5

Original Filed July 14, 1926

Inventor

Benjamin F. Fitch

By Bates Macklin Golick & Pearce

Attorney

Reissued Feb. 28, 1933

Re. 18,752

UNITED STATES PATENT OFFICE

BENJAMIN F. FITCH, OF GREENWICH, CONNECTICUT, ASSIGNOR TO MOTOR TERMINALS COMPANY, OF WILMINGTON, DELAWARE, A CORPORATION OF DELAWARE

SYSTEM AND APPARATUS FOR HANDLING FREIGHT

Original No. 1,802,010, dated April 21, 1931, Serial No. 122,310, filed July 14, 1926. Application for reissue filed January 28, 1932. Serial No. 589,518.

This invention relates to a method and apparatus for handling freight, and especially where the freight is stored in removable automobile bodies which are then handled as a unit. In extending such systems to permit the handling of freight in an expeditious manner on a large scale, it has heretofore been necessary to employ overhead traveling cranes for raising and transporting the containers along a station platform. As the system gradually expands, the necessity for excessive lengths of crane runways then becomes an objection, not only from the viewpoint of equipment required, but also from the viewpoint of time consumed in transferring the containers from one end of the platform to another. Moreover, in certain locations building conditions are such that overhead cranes cannot be readily installed and operated in a satisfactory manner.

The principal object of the present invention is to facilitate the handling of freight in large units by such transporting mechanism as will eliminate the necessity for overhead cranes, with objectionable long crane runways. Moreover, I contemplate the provision of a system where by the handling of freight in containers as a unit may be greatly facilitated to permit the freight to be loaded or unloaded at a break-bulk point.

One method of eliminating the objectionable long crane runways which has been proposed is to construct the containers in such manner that a load-lifting truck may engage beneath the bottom of a container, raise it and transport it from one place to another. In practice, however, the containers have such great weight and size that in order to support their load it is necessary to raise the container floor an appreciable distance above the ground or supporting platform to accommodate the floor beams. Now if in addition to this height of the floor, the container is raised to allow a truck, though of comparatively low height, to pass beneath it, the result is that the floor surface stands so far above the ground or support that it would be impractical to employ a ramp for hand trucking freight to and from the container.

I have solved this problem by employing a power truck which is adapted to engage the load on the outer sides thereof and to lift it a slight distance off the ground or supporting platform, and then to transport it from place to place upon a platform, and my invention comprises the provision of a lift truck having a pair of forwardly projecting low mounted lift or load elevating platforms capable of being moved into position to straddle a load, lift the same and transport it to destination. In this way I can eliminate the necessity for overhead traveling cranes which extend the entire length of the platform, and at the same time can effect suitable transfer of containers without raising the container floor to an objectionable height from the ground. Thus, I can extend the system to permit the handling of freight on an almost unlimited scale while maintaining the advantages inherent in a system embodying removable automobile body containers.

Another object of the invention is to provide a truck of the foregoing construction which is capable of lifting and transporting heavy loads, and in which the truck is provided with relatively small wide tread wheels beneath the spaced lift platforms capable of distributing the load, such wheels being preferably dirigible whereby the truck may be turned on a relatively short turning radius to permit it to be readily operated in restricted areas, around columns, etc.

A further object is to provide a power driven lift truck having a pair of forwardly projecting relatively narrow lift beams, each supported by means of longitudinally spaced load supporting wheels of small diameter arranged tandem beneath the lift beams, and in which the load wheels are capable of being turned substantially within the area of the lift beams in order to steer the truck on a short turning radius.

Other objects of the invention will appear in the following description and appended claims, reference being had to the accompanying drawings forming a part of this specification wherein like reference characters designate corresponding parts in the several views.

Figure 2:
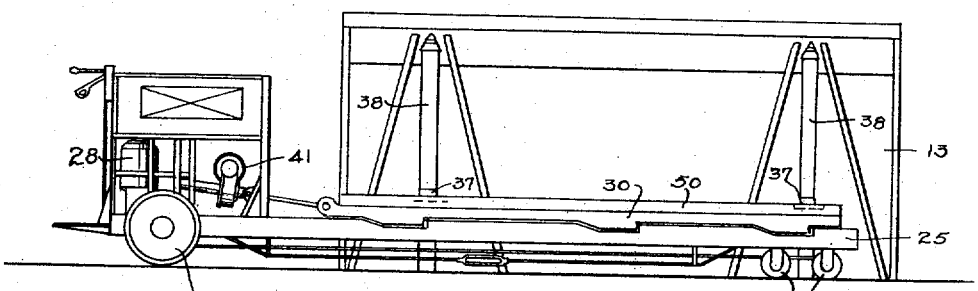
Figure 3:
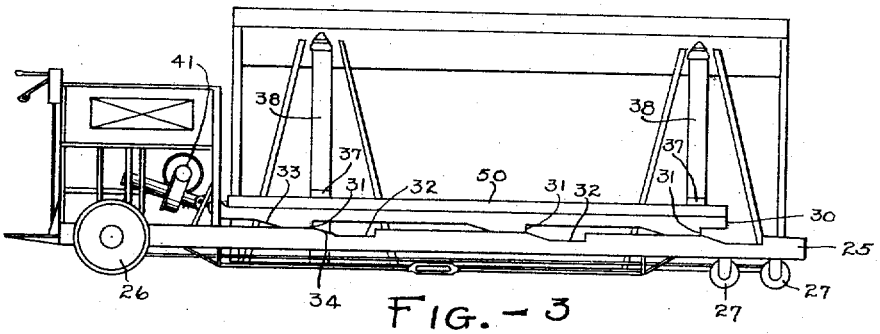
Figure 4:
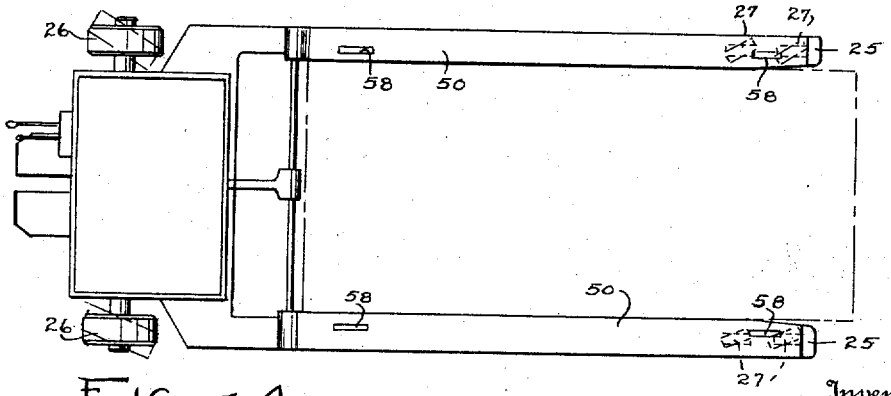
Figure 5:
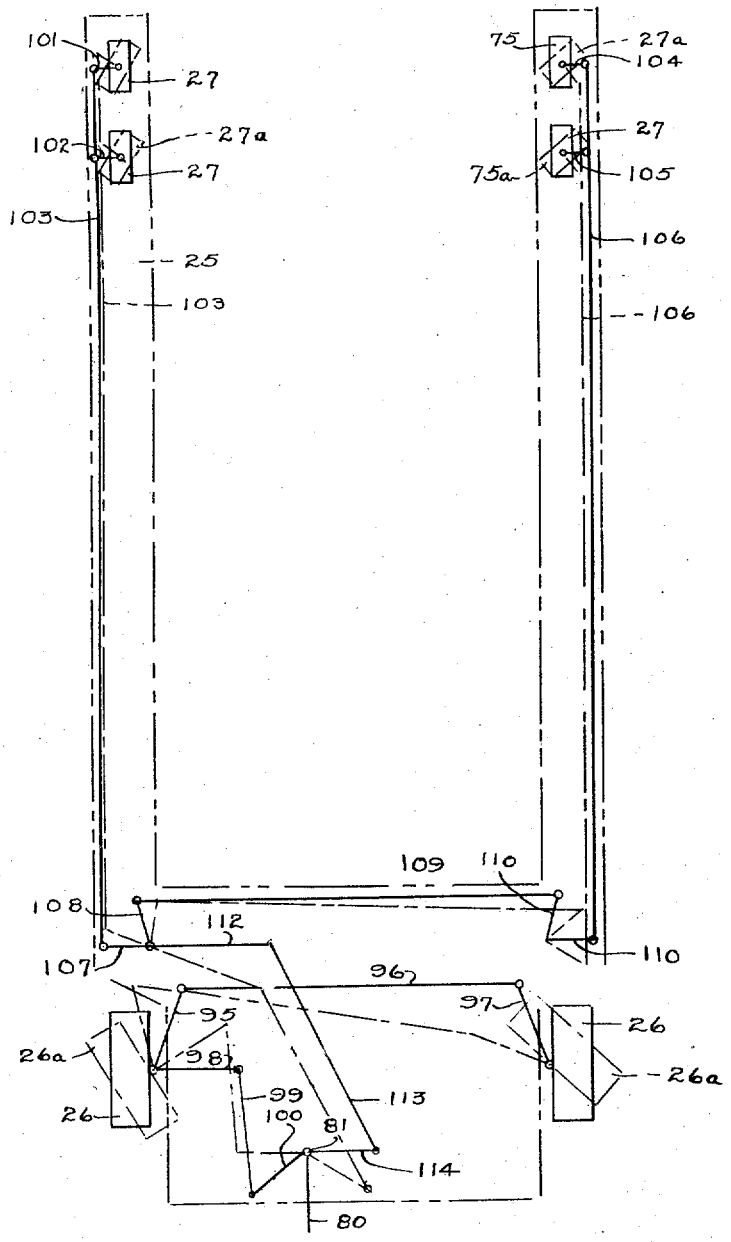
Figure 6:
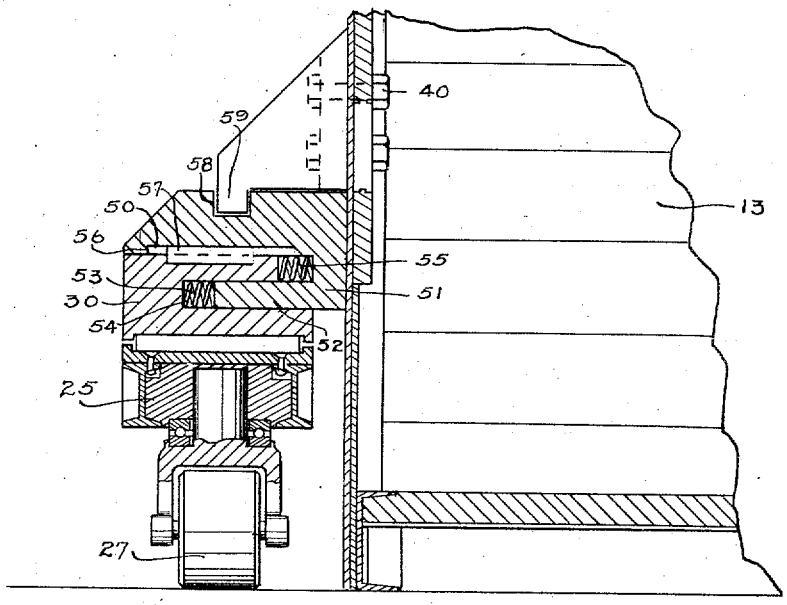
Figure 7:
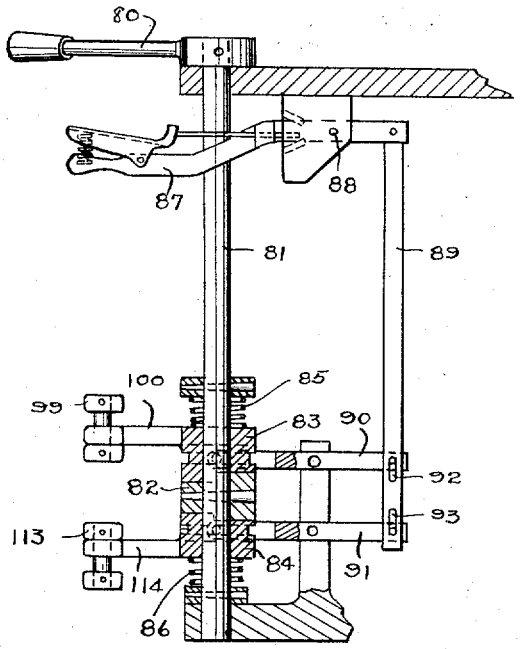
Figure 8:
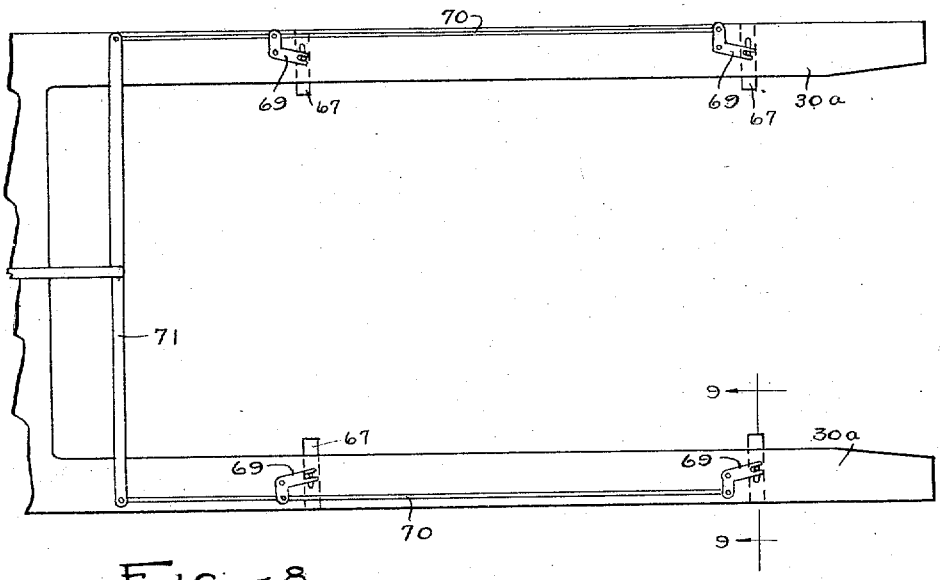
Figure 9:
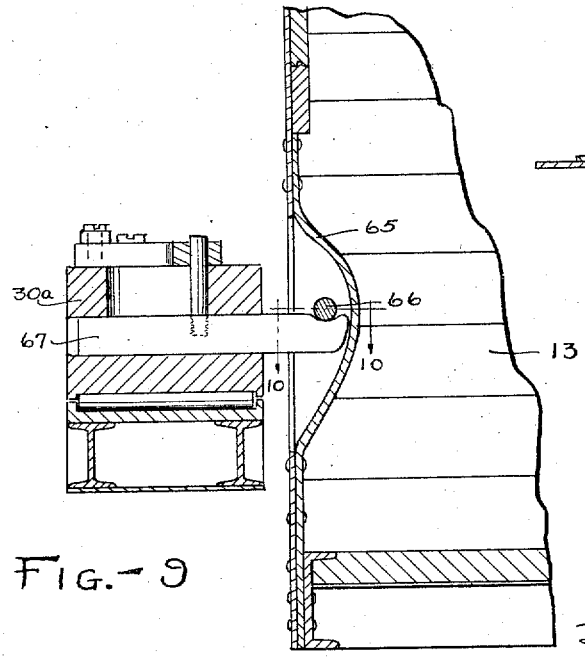
Figure 10:
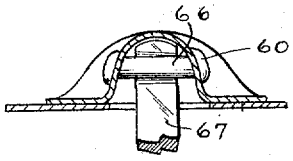

In the drawings Fig. 1 shows a station platform having a set of railroad tracks extending along one side and a truck platform along the other side with various forms of load engaging apparatus for carrying out my invention; Fig. 2 is a side view of a container showing a load lifting truck about to engage the container; Fig. 3 is a side elevation showing the container raised slightly above the ground; Fig. 4 is a plan view of the container and load lifting truck; Fig. 5 is a diagrammatic view showing the steering mechanism for the truck; Fig. 6 is a vertical section through a part of the container and truck; Fig. 7 is a vertical section on an enlarged scale adjacent to the operating end of the truck; Figs. 8 to 10 show a modified construction for effecting engagement of the load.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation, and it is not intended to limit the invention beyond the terms of the several claims hereto appended or the requirements of the prior art.

In Fig. 1 a station platform 10 is shown as having a set of railroad tracks along one side 11, and a truck-runway 12 along the opposite side and as being positioned for enabling containers indicated at 13, to be positioned cross-wise of the platform with a hand truck-runway on each side of the container. This view also shows a plurality of overhead cranes indicated in general at 14 and 15 respectively, by means of which a container may be transferred between a truck on the runway and a station platform. In addition, there are shown load lifting trucks 20 and 21 respectively, each of which is provided with means for engaging a container and raising it slightly above the platform to any desired position.

One way which I have shown of effecting the transfer of a container across the platform includes the use of a load lifting power truck comprising in general a frame having at one end an upright housing for supporting the motors, battery and control mechanism. Beneath this housing are mounted a pair of driving wheels. The frame at its other end is bifurcated to provide two narrow parallel spaced arms adjacent the ground. A narrow lift platform surmounts each forked frame arm. Beneath each arm of the frame are preferably located a pair of longitudinally spaced load wheels of small diameter and wide tread to distribute the load. These wheels are preferably mounted to turn substantially within the area of the frame arm on independent axes. A common steering mechanism is provided for turning the load wheels and driving wheels simultaneously about substantially a common turning center.

Referring now particularly to Figs. 2, 3 and 4, I have shown a truck having a pair of arms 25 which are adapted to extend longitudinally of the container and on opposite sides thereof. These arms may comprise beams which embody part of the truck frame and may be supported at one end by a set of wheels 26, and at the opposite end by sets of wheels 27. The truck has mechanism including a motor indicated in general at 28, for propelling it along the platform and also has mechanism for raising a container a slight distance above the platform. This mechanism shown has beams 30 which have a plurality of spaced projections 31 adjacent the under sides thereof. These projections are arranged to enter complementary shaped recesses 32 and associated arms 25. Provision is made for moving the beams 30 longitudinally of a container and relatively to the beams 25 wherefore the beams 30 are raised vertically with reference to the beam 25 when members 30 are moved toward the operating end of the truck. This follows by reason of the inclined surfaces 33 on the projections 31 which engage inclined surfaces 34 and the cooperating recess.

When the arms 25 are positioned along the side of the container then the vertical movement of the beams 30 with reference to the arms will effect the raising of the load since the upper surfaces of the beams engage members 37 which project outwardly from the side of the load. These members may be angle brackets which extend the entire length of the container, or as shown in Figs. 2 and 6 they may be relatively short spaced brackets which are rigidly connected as by securing members 40 to the load supporting straps 38 on the sides of the containers. To permit the free movement of the beams 30 with reference to beams 25 I may employ a plurality of rollers between the two members the usual way. I am not concerned, however, in this application with the details of the truck construction insofar as this feature is concerned, nor with the mechanism for moving the beams 30 with reference to the beams 25. I have merely indicated the mechanism as embodying a motor 41 surmounted on the truck adjacent the operating end and which is suitably geared to move the beam simultaneously on the arms.

To enable an operator to engage a load in an expeditious manner, I provide yieldable members which are carried by the outer truck adjacent the arms and function as guides to maintain proper relationship between the arms and load while the truck is being moved forwardly into engagement with the load. The length of the load makes the engaging operation a difficult task for an operator. With the apparatus I have shown, however, the ends of the arms can be easily directed to engage opposite sides of the load. Thereafter on continued forward motion of the truck, the operator can readily maintain a forward motion in the proper direction since the yieldable supports guide the track in the proper direction. These yieldable members in preferred form as shown in Fig. 6 embody U-shaped members having a top portion 50, a bottom portion 52 and a connecting portion 51. All three portions extend substantially the entire length of the beams 30 and are arranged to move laterally with reference thereto. Springs 54 and 55 are adapted to engage the bottom portion and connecting portion respectively and are adapted to urge the member inwardly toward the load. Such inward motion, however, is limited by a shoulder 56 on the top portion which may engage a shoulder on a key 57, which in turn is embedded in the top of the beam 30. A connecting slot in the top portion makes a splined connection between the beam and top portion which permits lateral motion and prevents longitudinal motion of the member with reference to the beam.

In positioning the upper truck with reference to the load, I may provide spaced pockets 58 in the top portions of the yieldable guide member into which a depending portion 59 of the brackets may extend. As the beams 30 are elevated with reference to the beams 25, the brackets will enter the pockets, wherefore the load will be satisfactorily held in adjusted position during the raising portion.

A modified construction for effecting engagement with a load by the use of power lift trucks is shown in Figs. 8, 9 and 10 wherein the load has a pocket 65 within the body thereof, with a pin 66 extending across the pocket and therefore inside the wall of the body. Laterally shiftable latch members 67 carried on the beams 30ᵃ may engage beneath the pin 66 so as to effect a lifting connection on the body whenever the load lifting mechanism on the truck is actuated. In the preferred form I have shown four of such latch members, two on each frame of the truck and have illustrated a bell crank 69 for actuating each member. If desired, all bell cranks may be actuated simultaneously by rods 70 which connect the two bell cranks on each frame and a cross rod 71 which connects the two ends of the rods 70. Any convenient means may be utilized for moving the cross bar 71 from the operator's position on the truck.

To permit the handling of a comparatively heavy load in size, I employ load supporting wheels 27 preferably arranged in pairs at each end of the truck arms. Moreover, in order to facilitate movement of the truck in a limited space, I so mount the wheels 27 that they may be turned conjointly with or independently of the wheels 26.

In Figs. 5 and 7, one form of steering mechanism is illustrated wherein an operating handle 80 rigidly mounted upon a vertically extending shaft 81 is arranged to guide both the forward and rearward wheels simultaneously or individually as desired. To this end I have shown the shaft 81 as having one member 82 of a jaw clutch rigidly mounted thereon and as having cooperating members 83 and 84 which are normally urged into engagement with the member 82 by means of springs 85 and 86 respectively. The clutch, however, may be selectively disengaged from the member 82 by a hand actuated lever 87 which is pivotally connected at 88 to the truck frame within the shaft 81 and is operatively connected to the clutch members 83 and 84 by a vertical link 89 and horizontal links 90 and 91 respectively. Slots 92 and 93 in the vertical link determine the particular clutch member which is to be actuated whenever the lever 87 is operated. For example, in Fig. 7 the lever 87 is shown in a position wherein both clutch members 83 and 84 are in engagement with the member 82. Under this condition, both the forward and rearward wheels will be turned simultaneously. If, however, the lever 87 is moved upwardly thereto, throwing the clutch member 83 out of engagement with the member 82, then only one set of wheels will be actuated whenever the handle 80 is turned. On the other hand, if the member 87 is moved to downward position, then the member 84 will be thrown out of engagement with the member 82 and the member 83 will be locked into engagement, wherefore movement of the handle 80 will turn the other set of wheels.

In Fig. 5 I have shown diagrammatically a form of steering apparatus wherein one set of wheels indicated at 26 are interconnected by links 95, 96 and 97 and are arranged to be operatively connected to the shaft 81 by links 98, 99 and 100 respectively. On the other hand, one of the sets of wheels 27 are arranged to be interconnected by links 101, 102 and 103, while those on the opposite side are connected by links 104, 105 and 106. The links 103 and 106 are in turn interconnected by members 107, 108, 109, 110 and 111 respectively. To modify the link 109 I have shown a member 112 which may be a continuation of the member 107 and which may be pivotally connected to a link 113, through a link 114 to shaft 81. When the handle 80 is in a full line position shown in Fig. 5, then all sets of wheels are pointing in a direction extending longitudinally of the truck. When the handle is moved to the broken line position, then the set of linkage for actuating the wheels 26 is actuated as shown by the dash lines to shift the wheels to the position shown in the dash lines 26*a*. Moreover, the linkage connecting the shaft 81 to the wheels 27 is actuated to shift such wheels to the position shown by the dot and dash lines indicated at 27*a*.

Freight handling apparatus made in accordance with the present invention permits the extension of freight handling systems embodying the use of removable automobile bodies to almost an unlimited extent without necessitating the excessive expenditure of funds in overhead crane equipment and at the same time facilitates the handling of freight by increasing the available positions in which the containers may be placed upon a platform or other supporting surface.

A further advantage of the system as set forth herein is that the freight may be transferred between a truck and a station platform with a minimum idle period for the truck.

To illustrate one way in which a system is operated in accordance with my invention reference may be had to Fig. 1 wherein a truck 120 is shown as standing in the runway adjacent the platform 10. Assuming that the truck has arrived at the platform with a loaded body, then the overhead crane 14 may be shifted laterally to pick up the body, raise it, transport it and deposit it upon the platform. To effect such movement the crane travel need be only slightly greater than twice the width of a body. Thereafter the cranes are disengaged from the load, a power truck operable upon the platform is moved into engagement with the load, is actuated to raise it clear of the platform and then to transport it to any desired place on the platform. In the meantime, the motor truck may be driven along the truck-runway and stopped beneath the runway for the crane 15. This crane will then pick up another body which previously will have been deposited by the power truck beneath the crane runway and then move it laterally and deposit it upon the motor truck. Thus a loading and unloading operation may be accomplished without necessitating any appreciable idle time of the motor truck and the operator therefor. On the other hand by utilizing a comparatively large number of power lift trucks, the bodies may be handled as quickly as they arrive at the platform and they may be manipulated about the platform to bring any one body as near as possible to a car into which the freight is to be transferred. Again this system is advantageous in that the containers may be readily manipulated on the platform to permit the transfer of freight from one to another sub-station or off track terminal transfer points.

By employing a fork truck such as that embodied in this application, it is possible to handle large loads as units by simply causing the lift platforms of the truck to straddle the load, attaching the brackets or lifting members to the load and thereafter lifting the platforms 30. When thus supported by the truck, the truck may be propelled and steered into the proper position for unloading, and the load then deposited upon the platform, and the truck released for other work.

I claim:

1. In combination, a removable automobile body having spaced downwardly facing shoulders, a power lift truck having spaced arms adapted to extend along the opposite outer sides of the body, means associated with the arms for raising the body and yieldable guides carried by the arms and functioning to slidably engage the side of the body for assisting in guiding the arms during the load engaging operation.

2. A system of handling freight comprising in combination a movable automobile body rectangular in form and having a bottom, end walls and side walls, shoulders projecting outwardly from the side walls near their lower ends, and a power truck having arms adapted to embrace the sides of the automobile body beneath the shoulders, said arms being provided with power lift means adapted to shove upwardly on said shoulders.

3. The combination, with an automobile body having side walls and vertical side straps on the outer sides of its walls, brackets projecting outwardly from the side straps some distance above the bottom of the body, of a truck having power propelling mechanism and a pair of spaced parallel arms, wheels supporting said arms, the arms being adapted to embrace the body underneath the brackets, and means on the arms raisable by power to shove upwardly on the brackets.

4. In a system of handling freight, the combination with an automobile truck and a demountable body having side walls, of a transfer station having a platform, a truck runway adjacent the platform, a traveling crane mounted on tracks overhanging both the truck runway and platform and having depending raising mechanism adapted to engage the demountable automobile body, and a power truck traveling on the platform and having a pair of spaced arms adapted to embrace the same automobile body, said arms being connected together at one end, and disconnected at the other end, power mechanism at such connected end for propelling the platform truck, wheels supporting the opposite end portions of the arms, outwardly projecting shoulders on the automobile body, and means on the arms of the platform truck adapted to stand beneath said shoulders and shove upwardly thereon.

5. In a system of handling freight, the combination with a power road truck, a demountable body in rectangular form having side walls and adapted to be mounted on the truck, and a platform truck having spaced side arms so located as to embrace the side walls of the same body, shoulders on the sides of the body such distance above the bottom plane of the body that the truck arms may pass beneath them when the body and truck are standing on the same platform, and raising means on the side arms to engage the shoulders.

6. The combination with a demountable automobile body, of a truck for transporting the same, comprising a main end portion and a pair of laterally spaced portions extending from one end of said main portion adjacent the ground and such distance apart that they can be positioned closely adjacent opposite sides of the body, power driven ground wheels supporting the main end portion of the frame, swiveled load supporting wheels mounted beneath each of said laterally spaced portions within the width thereof, raisable load supporting members on said laterally spaced portions, and means at the main end portion for operating the two raisable members as a unit.

7. The combination with a demountable automobile body, of a truck for transporting the same having a frame comprising a main end portion and a pair of laterally spaced parallel portions extending from one end of said main portion adjacent the ground and a distance apart selected according to the width of the body whereby they can be positioned at opposite sides of the body to be transported by the truck, ground wheels supporting the main end portion of the frame, swiveled load supporting wheels mounted beneath each of said laterally spaced frame members, said wheels lying substantially between the vertical planes of the side faces of said spaced frame members in all dirigible positions, and raisable load supporting members on said laterally spaced portions.

8. The combination with an automobile body having side walls and brackets projecting outwardly from the side walls some distance above the bottom of the body, of a truck having power-propelling mechanism and a pair of spaced parallel arms, the arms being adapted to closely embrace the body underneath the brackets, means on the arms raisable by power to shove upwardly on the brackets, the body extending below the arms in the raised position, and swiveled wheels supporting said arms, said wheels lying substantially within the width of the arms in all positions, whereby the wheels will not contact with the body depending from the brackets.

Signed at New York city, New York, this 21st day of January, 1932.

BENJAMIN F. FITCH.